United States Patent
Li

[19]

[11] Patent Number: 5,903,008
[45] Date of Patent: May 11, 1999

[54] SCATTER CORRECTION METHODS AND SYSTEMS IN SINGLE PHOTON EMISSION COMPUTED TOMOGRAPHY

[75] Inventor: Jianying Li, New Berlin, Wis.

[73] Assignee: General Electric Company, Milwaukee, Wis.

[21] Appl. No.: 08/888,341

[22] Filed: Jul. 2, 1997

[51] Int. Cl.$^6$ .................................................. G01T 1/161
[52] U.S. Cl. .............................. 250/363.04; 250/363.07; 250/363.02; 378/7
[58] Field of Search .................. 250/363.02, 363.04, 250/363.07, 369; 378/7, 86

[56] References Cited

U.S. PATENT DOCUMENTS

| | | | |
|---|---|---|---|
| 5,434,414 | 7/1995 | Berlad et al. | 250/363.07 |
| 5,608,221 | 3/1997 | Bertelsen et al. | 250/369 |
| 5,615,279 | 3/1997 | Yoshioka et al. | 378/7 |
| 5,663,500 | 5/1997 | Morgan et al. | 250/363.07 |

*Primary Examiner*—Constantine Hannaher
*Assistant Examiner*—Darren M. Jiron
*Attorney, Agent, or Firm*—John S. Beulick; Christian G. Cabou; Phyllis Y. Price

[57] ABSTRACT

An emission tomographic system for imaging an object of interest is described. The system, in one form, includes a gantry and a patient table. A detector including a collimator is secured to the gantry, and a computer is coupled to the gantry and to the detector to detect and control the position of the detector relative to the table. The system is configured to determine a transmission measurement and generate a scatter fraction utilizing the transmission measurement. A dual energy window data acquisition algorithm then determines non-scatter photons in a primary energy window utilizing the scatter fraction.

20 Claims, 1 Drawing Sheet

SCATTER CORRECTION METHODS AND SYSTEMS IN SINGLE PHOTON EMISSION COMPUTED TOMOGRAPHY

FIELD OF THE INVENTION

This invention relates generally to single photon emission computed tomography (SPECT) imaging and, more particularly, to scatter correction systems and methods for improving images generated from data collected by a SPECT scanner.

BACKGROUND OF THE INVENTION

In nuclear emission tomography, gamma cameras or detectors typically are used for locating and displaying human glands and organs and associated abnormalities. Abnormalities may be represented by higher uptake or lower uptake than the surrounding tissue. More specifically, and with respect to using a gamma camera, gamma-ray-emitting tracer material is administered to a patient, and the tracer material is more greatly absorbed by the organ of interest than by the other tissues. The gamma camera generates data, or an image, representing the distribution of such tracer material within the patient.

A gamma camera includes a multi-channel collimator and a gamma ray detector which converts energy from the gamma ray into an electrical signal which can be interpreted to locate the position of the gamma ray interaction in the planar detector. One known gamma ray detector which is commonly used is an Anger gamma camera, which is described in H. O. Anger, "Scintillation Camera", Rev. Sci. Instrun., Vol. 29, p. 159 (1958). Another known detector is a multi-crystal scintillation detector which has an array of small crystals coupled to an array of light detectors, which may be either photomultipliers or photodiodes. Yet another known detector is a solid-state position sensitive detector which converts energy from the gamma ray into an electrical charge which can be detected by an array of contacts.

The Anger gamma camera includes a large scintillation crystal responsive to radiation stimuli, i.e., gamma rays emitted by the patient. An array of photomultiplier tubes typically are optically coupled to the crystal. In operation, the gamma rays emitted by the patient in the direction of the detector are collimated onto the crystal, and each gamma ray which interacts with the crystal produces multiple light events. The multiple light events are detected by photomultipliers adjacent to the point of interaction. The photomultiplier tubes, in response to the light events, produce individual electrical outputs. The signals from the array of photomultipliers are combined using analog and digital circuitry to provide an estimate of the location of the gamma ray event. Further analog and digital processing is used to produce more accurate position coordinates to form the acquired image.

More particularly, to generate an image, a representation of the distribution of events in the crystal is generated by utilizing a matrix of storage registers whose elements are in one-to-one correspondence with elemental areas of the crystal. The crystal elemental areas are identified by coordinates. Each time a light event occurs in the crystal, the event coordinates are identified and the register in the storage register matrix corresponding to the identified event coordinates is incremented. The contents of a given register in the matrix is a number that represents the number of events that have occurred within a predetermined period of time within an elemental area of the crystal. Such number is directly proportional to the intensity of radiation emitted from an elemental area of the radiation field. The number stored in the register therefore is used to establish the brightness of a display picture element corresponding to the crystal elemental area. The distribution of a radiation field is displayed in terms of the brightness distribution of the display.

In emission tomography a plurality of such images are taken at various view angles around the organ of interest. Typically, in transaxial tomography, a series of images, or views, are taken at equal angular increments around the patient. The series of views around the patient are reconstructed to form transaxial slices, that is, slices across the axis of rotation. The process of acquiring the views and reconstructing the transaxial slices is termed emission computed tomography (ECT) or single photon emission computed tomography (SPECT). Similar reconstruction concepts are employed in X-ray computed tomography (CT) in which X-rays are used to measure patient attenuation and to reconstruct the attenuation in transverse sections.

Photon attenuation and scatter directly affect image resolution. Particularly, photon attenuation and scatter typically cause image artifacts and degrade SPECT image quality both qualitatively and quantitatively. One known method of reducing artifacts caused by photon attenuation is to utilize iterative reconstructions, such as maximum likelihood expectation maximization, and an attenuation map. While such method reduces photon attenuation artifacts, such method does not noticeably reduce artifacts caused by photon scatter. Images generated with only photon attenuation correction, i.e., without also correcting photon scatter, often demonstrate reduced contrast, or even artificially increased or decreased activity levels.

Many methods have been implemented to compensate for the detection of scatter photons such as Compton scatter photons. Such methods include utilizing deconvolution techniques, spectral fittings methods, and matrix-based inverse Monte Carlo techniques. Each of these methods, however, is complex and substantially difficult to implement in a SPECT system.

Another method for compensating for scatter photons, which is more easily implemented, is known as the dual energy window scatter subtraction method. In this method, a first window is placed over the primary energy window, or photopeak window, and a second window is placed below the photopeak window. Projections acquired from the second energy window are multiplied to a single-value scatter fraction, which typically is either object independent or source location-dependent, to generate an estimated scatter projection in the primary energy window. The estimated scatter projection in the primary energy window is then subtracted from the projections acquired from the first window to estimate the non-scatter photons in the primary energy window. Accordingly, the dependence of the scatter component of the photopeak image on surrounding activity is determined on a patient specific basis, reducing the number of assumptions required in the correction methodology. The known dual energy window scatter subtraction method, while generally successful, requires significant operator intervention to determine the single-value scatter fraction.

It would be desirable to provide more accurate scatter correction and reduce operator intervention necessary to achieve such improved correction. It also would be desirable to provide a patient-dependent scatter fraction, as compared to a single-value scatter fraction.

SUMMARY OF THE INVENTION

These and other objects may be attained by a system which, in one embodiment, determines scatter fractions directly from transmission measurements during cardiac imaging. More particularly, the system generates a "three-dimensional (3D)" scatter fraction utilizing transmission measurements, and the 3D scatter fraction is utilized to perform dual energy window scatter correction to reduce image artifacts caused by photon scatter. Particularly, the scatter fraction can be utilized to generate an estimated scatter projection which is then subtracted from collected data or to generate a reconstruction model.

In accordance with one embodiment of the present invention, and during a scan, a first window is placed over a primary energy window, or photopeak window, and a second window is placed below the photopeak window. Projections acquired from the second energy window are multiplied to the 3D scatter fraction to generate an estimated scatter projection in the primary energy window. The estimated scatter projection in the primary energy window is then subtracted from the projections acquired from the first window to estimate the non-scatter photons in the primary energy window. Alternatively, iterative reconstruction modeling may be performed utilizing the estimated scatter projection in the primary energy window, e.g., the estimated scatter projection in the primary window is added to an estimated scatter-free projection to match the acquired projections $P_p$ acquired from the first energy window.

The above described scatter correction is believed to remove scatter contribution from liver activity to the myocardium more effectively than known scatter correction methods. Such correction also provides "three-dimensional (3D)" scatter fractions determined directly from the transmission scans, and substantially eliminates extra user intervention necessary for known systems to generate single value scatter fractions.

DETAILED DESCRIPTION

Figure 1:
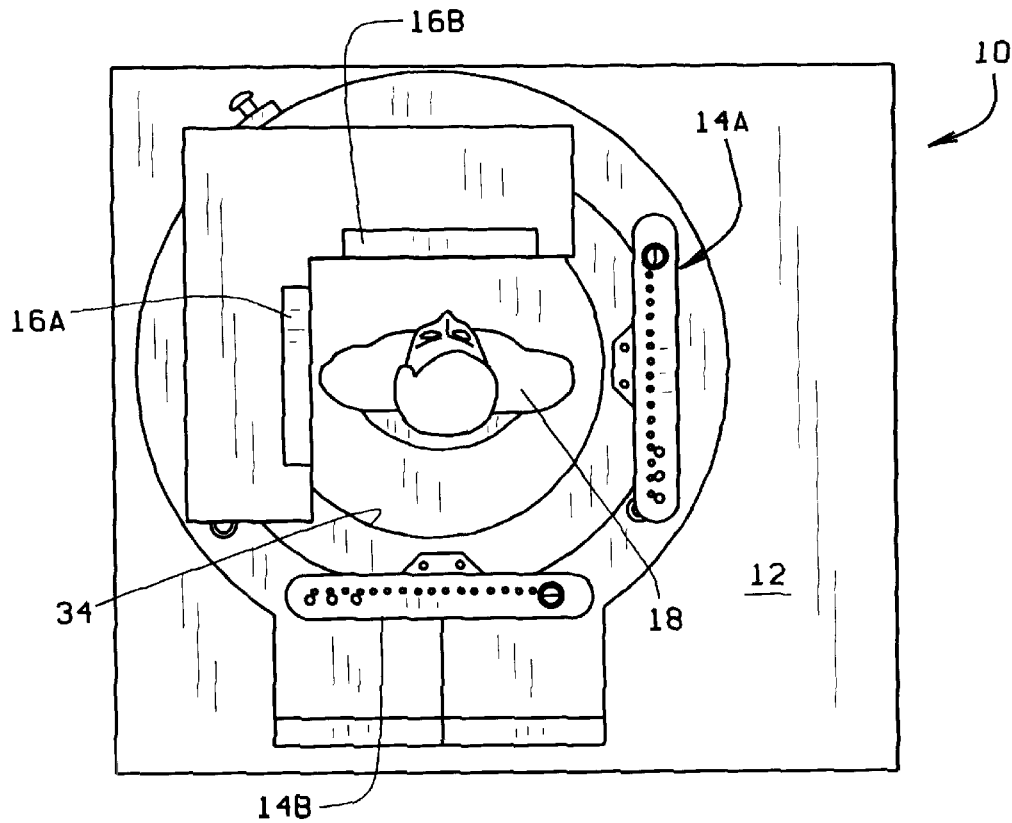
FIG. 1 is a perspective view of an emission tomography system.
Figure 2:
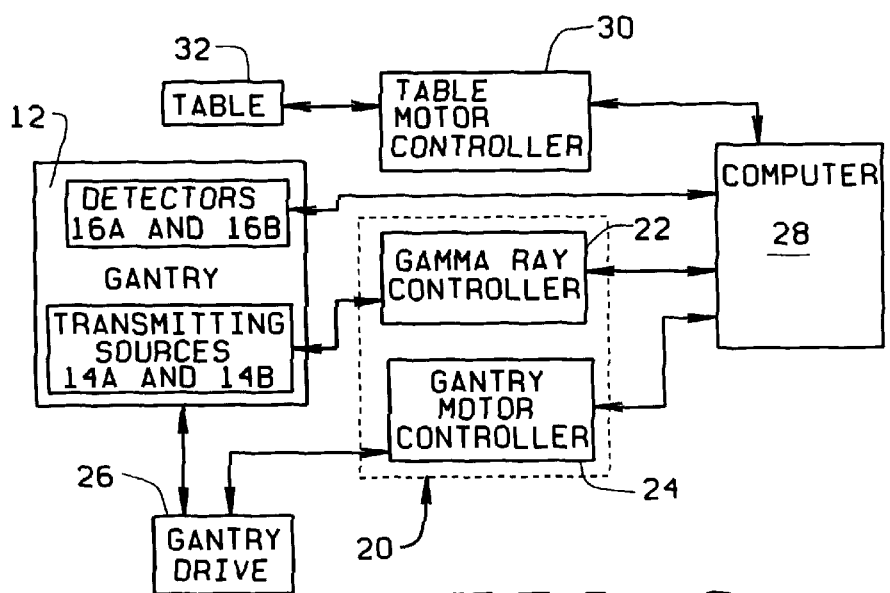
FIG. 2 is a block schematic diagram of the system illustrated in FIG. 1.

Referring to FIGS. 1 and 2, an emission tomography (ET) imaging system 10 is shown as including a gantry 12. Gantry 12 has a first transmitting source 14A that transmits gamma rays toward a detector 16A and a second transmitting source 14B that transmits gamma rays toward a detector 16B. Each detector 16A and 16B is a gamma camera and detects gamma ray energy emitted by an object of interest, such as a medical patient 18, or transmitting sources 14A and 14B, respectively. During a scan to image data, gantry 12 and the components mounted thereon rotate about a center of rotation.

Detectors 16A and 16B each include a collimator and a scintillation crystal, which operate in a well known manner to sense gamma rays that pass through and are emitted from medical patient 18. Particularly, each scintillation crystal senses collimated gamma ray radiation and produces electrical signals representing the intensity of the received gamma rays. Each detector 16A and 16B may, for example, be an Anger gamma camera or solid-state position sensitive detector.

Rotation of gantry 12 and the operation of transmitting sources 14A and 14B are governed by a control mechanism 20 of ET system 10. Control mechanism 20 includes a gamma ray controller 22 that provides power and timing signals to transmitting sources 14A and 14B. Control mechanism 20 also includes a gantry motor controller 24 that controls the rotational speed and position of gantry 12. Particularly, gantry motor controller 24 is coupled to a gantry drive 26 that provides power and signals to gantry 12.

A computer 28 is coupled to gantry motor controller 24 to provide control signals and information to gantry drive 26, and to gamma ray controller 22 to provide control signals and information to transmitting sources 14A and 14B. Computer 28 also is coupled to detectors 16A and 16B, respectively, to store data obtained from such detectors 16A and 16B and to generate an image utilizing such data. In addition, computer 28 operates a table motor controller 30 which controls a motorized table 32 to position patient 18 in gantry 12. Particularly, table 32 moves portions of patient 22 through a gantry opening 34.

In operation, system 10 performs both an emission scan and a transmission scan. For the emission scan, patient 18 receives an internal dose of radio pharmaceutical compounds which emit gamma ray energy, and is positioned on patient table 32. Patient table 32 is positioned along the central longitudinal axis of gantry opening 34, also referred to herein as the center of gantry rotation. Computer 28 then operates gantry 12 so that detectors 16A and 16B rotate about the center of gantry rotation and patient 18 and collect data in a well known manner. After performing the emission scan, a transmission scan is performed over the same arc and for the same number of views as the emission scan. Particularly, transmitting sources 14A and 14B emit gamma ray energy through patient 18 and toward respective detectors 16A and 16B. The transmission scan is then utilized in combination with the emission scan to generate an image in a well known manner.

As explained above, photon attenuation and scatter typically cause image artifacts and degrade image quality both qualitatively and quantitatively. Known methods for compensating for scatter photons are complex and substantially difficult to implement in ET systems. Moreover, such methods typically require significant operator intervention.

System 10, in one embodiment, is configured to reduce photon scatter utilizing a dual energy window data acquisition algorithm and without requiring significant operator intervention. More particularly, in executing the algorithm, a first window is placed over the primary energy window, or photopeak window, and a second window is placed below the photopeak window. Non-scatter projections in the primary energy window, $P_n$, are expressed as:

$$P_n = P_p - k \ast P_s \quad (1)$$

where:
$P_p$ represents total projections in the primary energy window;
$P_s$ represents scattered photons in the second window; and
k is a scatter fraction.
Scatter fraction k is defined as:

$$k = \frac{S_p}{P_s} \quad (2)$$

where:
$S_p$ is a number of scattered photons in the primary energy window; and
$P_s$ is a number of scattered photons in the secondary window.

For a point source, or emission source, in a uniform media, e.g., in a water bath, scatter fraction k may be expressed as:

$$k = A - B^* \exp(-C^* \mu d) \quad (3)$$

where:

$\mu$ is an attenuation coefficient of the point source in water;

d is a depth of the point source inside the water bath;

A a first constant;

B a second constant; and

C a third constant.

Constants A, B, and C are pre-determined and are dependent on the energy windows of the detection system and the radioisotopes used during scanning. Constants A, B, and C may be stored, for example, in a memory of computer 28.

In known emission tomography systems, scatter fraction k typically has a single-value, and is either object-independent or source location-dependent. In addition, significant operator intervention typically is required to determine scatter fraction k.

In accordance with one embodiment of the present invention, however, emission tomography system 10 is configured to determine a three dimensional ("3D") scatter fraction k(i,j,l) for each pixel location (i,j) and each detection angular view l. Each scatter fraction k(i,j,l) is determined utilizing a transmission measurement, i.e., scatter fraction k(i,j,l) is related directly to the transmission measurement.

When utilizing a dual energy window data acquisition algorithm, a transmission measurement may be expressed as:

$$T/T_0 = \exp\left[\Sigma_i \mu_i d_i\right] = \exp(-\mu_{TCT} D) \quad (4)$$

where:

T is a projection of a transmission scan, i.e., a scan performed while an object such as patient 18 is positioned in a scanning position;

$T_0$ is a projection of a blank scan, i.e., a scan performed without an object such as patient 18 positioned in a scanning position;

D is a water-equivalent total body width that the transmission source passes through; and $\mu_{TCT}$ is a transmission source water attenuation coefficient.

For each gamma ray that contributes to a pixel (i,j) on a surface of detector 16A and 16B, a water-equivalent length D of such ray is determined. Since scatter contribution differs for each point source at a different location on such ray, scatter fraction k(i,j,l) also is different at different locations on such ray. At a substantially middle point along the ray, it can be assumed that the source at that point represents the average scatter contributions to the projections at that pixel (i,j). Therefore, for each pixel (i,j) at each detection angular view l, scatter fraction k(i,j,l) is:

$$k(i,j,l) = A - B^* \exp(-C^* \mu_{TCT} D(i,j,l)/2) \quad (5)$$

$$k(i,j,l) = A - B^* [\exp(-\mu_{TCT} D(i,j,l))]^{C/2}$$

Substituting equation (4) into equation (5), scatter fraction k(i,j,l) may be expressed as:

$$k(i,j,l) = A - B^* [T/T_0]^{C/2} \quad (6)$$

Accordingly, each scatter fraction k(i,j,l) is directly related to transmission measurement $T/T_0$.

When T becomes zero, and referring to equation (6), scatter fraction k(i,j,l) substantially equals first constant A, which is undesirable because such value also in an asymptotic limit. To substantially avoid determining scatter fraction k(i,j,l) to be upper limit value A, zeros in the transmission planar are replaced with a value of:

$$T_0^* \exp(-\mu_{TCT}^* 2^* R), \quad (7)$$

where R is a radius of rotation of gamma camera (not shown) or detectors 16A and 16B. More particularly, if $T/T_0 = 0$, then $k(i,j,l) = T_0^* \exp(-\mu_{TCT}^* 2^* R)$, which is substantially equivalent to the attenuation caused by an object of 2R width filled with water.

Each "3D" scatter fraction k(i,j,l) is utilized in equations (1) and (2) to determine non-scatter projections $P_n$ in the primary energy window. Particularly, scatter fraction k(i,j,l) is multiplied to projections $P_s$ in the second window to generate an estimated scatter projection in the primary energy window. The estimated scatter projection in the primary energy window is then subtracted from the projections $P_p$ acquired from the first window to estimate the non-scatter photons in the primary energy window or used in the modeling method in iterative reconstructions.

Alternatively, iterative reconstruction modeling may be performed utilizing the estimated scatter projection in the primary energy window. Particularly, an estimated scatter-free projection is determined using an assumed source object and a probability matrix, and the estimated scatter projection in the primary window is added to the estimated scatter-free projection to match the acquired projections $P_p$ acquired from the first energy window.

Determining and applying "3D" scatter fractions k(i,j,l) are believed to be more desirable than determining and applying single value scatter fractions. In addition, such determination is not believed to require any extra user intervention as compared to the intervention required in known dual energy window data acquisition algorithms utilizing single value scatter fractions.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, while the ET system described herein included two detectors 16A and 16B, ET system may include either fewer than two detectors, e.g., one detector, or more than two detectors, e.g., three or four detectors. Accordingly, the spirit and scope of the invention are to be limited only by the terms of the appended claims.

I claim:

1. An emission tomographic system for imaging an object of interest, said system comprising a gantry having at least one detector secured thereto, a patient table, at least one transmitting source, and a computer coupled to the gantry and to the detector to detect and control the position of the detector relative to the table, said transmitting source configured to transmit gamma rays toward said detector, said system configured to:

determine a transmission measurement; and generate a three-dimensional scatter fraction utilizing the transmission measurement.

2. An emission tomographic system in accordance with claim 1 wherein said transmission measurement is determined in accordance with:

$$T/T_0 = \exp(-\mu_{TCT} D)$$

where:

T is a projection of a transmission scan;

T₀ is a projection of a blank scan;

D is a water-equivalent total body width that the transmission source passes through; and $\mu_{TCT}$ is a transmission source water attenuation coefficient.

3. An emission tomographic system in accordance with claim 2 wherein said scatter fraction is generated in accordance with:

$$k(i,j,l) = A - B*[T/T_0]^{C/2}$$

where:

k(i,j,l) is said scatter fraction;

A is a first constant;

B is a second constant; and

C is a third constant.

4. An emission tomographic system in accordance with claim 3 wherein if T/T₀ equals zero, then said scatter fraction is generated in accordance with:

$$T_0 * \exp(-\mu_{TCT} * 2 * R),$$

where R is a radius of rotation of the detector.

5. An emission tomographic system in accordance with claim 3 wherein at least one of said first constant A, said second constant B, and said third constant C is stored in a memory of said computer.

6. An emission tomographic system in accordance with claim 1 further configured to reduce photon scatter utilizing a dual energy window data acquisition algorithm.

7. A method for performing a tomographic scan of an object with an emission tomographic system including a gantry having at least one detector and at least one transmitting source secured thereto, a patient table, and a processor coupled to the gantry and to the detector to detect and control the position of the detector relative to the table, said method comprising the steps of:

determining a transmission measurement; and generating a three-dimensional scatter fraction utilizing the transmission measurement.

8. A method in accordance with claim 7 wherein said transmission measurement is determined in accordance with:

$$T/T_0 = \exp(-\mu_{TCT} D)$$

where:

T is a projection of a transmission scan;

T₀ is a projection of a blank scan;

D is a water-equivalent total body width that the transmission source passes through; and $\mu_{TCT}$ is a transmission source water attenuation coefficient.

9. A method in accordance with claim 8 wherein said scatter fraction is generated in accordance with:

$$k(i,j,l) = A - B*[T/T_0]^{C/2}$$

where:

k(i,j,l) is said scatter fraction;

A is a first constant;

B is a second constant; and

C is a third constant.

10. A method in accordance with claim 9 wherein if T/T₀ equals zero, then said scatter fraction is generated in accordance with:

$$T_0 * \exp(-\mu_{TCT} * 2 * R),$$

where R is a radius of rotation of the detector.

11. A method in accordance with claim 9 wherein at least one of said first constant A, said second constant B, and said third constant C is stored in a memory of said computer.

12. A method in accordance with claim 7 wherein the emission tomographic system is configured to reduce photon scatter utilizing a dual energy window data acquisition algorithm.

13. A method for performing scatter correction in radiographic imaging, said method comprising the steps of:

acquiring projection data for a primary window;

generating a three-dimensional scatter fraction; and generating estimated scattered projections in the primary window using the three-dimensional scatter fraction.

14. A method in accordance with claim 13 further comprising the step of determining a transmission measurement.

15. A method in accordance with claim 14 wherein said transmission measurement is determined in accordance with:

$$T/T_0 = \exp(-\mu_{TCT} D)$$

where:

T is a projection of a transmission scan;

T₀ is a projection of a blank scan;

D is a water-equivalent total body width that the transmission source passes through; and $\mu_{TCT}$ is a transmission source water attenuation coefficient.

16. A method in accordance with claim 15 wherein said scatter fraction is generated in accordance with:

$$k(i,j,l) = A - B*[T/T_0]^{C/2}$$

where:

k(i,j,l) is said scatter fraction;

A is a first constant;

B is a second constant; and

C is a third constant.

17. A method in accordance with claim 16 wherein if T/T₀ equals zero, then said scatter fraction is generated in accordance with:

$$T_0 * \exp(-\mu_{TCT} * 2 * R),$$

where R is a radius of rotation of the detector.

18. A method in accordance with claim 16 wherein at least one of said first constant A, said second constant B, and said third constant C is stored in a memory of said computer.

19. A method in accordance with claim 13 further comprising the step of subtracting the estimated scattered projections from the projection data acquired for the primary window.

20. A method in accordance with claim 13 further comprising the step of performing iterative reconstructions utilizing the estimated scattered projections in the primary window.

* * * * *